(12) United States Patent
Coulthard et al.

(10) Patent No.: US 7,458,062 B2
(45) Date of Patent: *Nov. 25, 2008

(54) FRAMEWORK TO ACCESS A REMOTE SYSTEM FROM AN INTEGRATED DEVELOPMENT ENVIRONMENT

(75) Inventors: Phil Coulthard, Aurora (CA); Donald J. Yantzi, Toronto (CA); Eric V. Simpson, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1061 days.

This patent is subject to a terminal disclaimer.

(21) Appl. No.: 10/286,559

(22) Filed: Oct. 31, 2002

(65) Prior Publication Data

US 2004/0003371 A1    Jan. 1, 2004

(30) Foreign Application Priority Data

Jun. 26, 2002 (CA) .................................. 2391733

(51) Int. Cl.
*G06F 9/44* (2006.01)
(52) U.S. Cl. .................. 717/121; 717/108; 717/116
(58) Field of Classification Search .......... 717/100–123
See application file for complete search history.

(56) References Cited

U.S. PATENT DOCUMENTS

| 5,327,559 | A |   | 7/1994  | Priven et al.      |        |
|-----------|---|---|---------|--------------------|--------|
| 5,432,900 | A |   | 7/1995  | Rhodes et al.      |        |
| 5,442,791 | A |   | 8/1995  | Wrabetz et al.     |        |
| 5,515,508 | A |   | 5/1996  | Pettus et al.      |        |
| 5,655,148 | A | * | 8/1997  | Richman et al.     | 710/8  |
| 5,694,601 | A |   | 12/1997 | White              |        |
| 5,706,502 | A |   | 1/1998  | Foley et al.       |        |
| 5,953,525 | A |   | 9/1999  | Glaser et al.      |        |
| 6,016,392 | A |   | 1/2000  | Jordan             |        |
| 6,065,043 | A |   | 5/2000  | Domenikos et al.   |        |
| 6,067,580 | A |   | 5/2000  | Aman et al.        |        |
| 6,167,453 | A |   | 12/2000 | Becker et al.      |        |

(Continued)

FOREIGN PATENT DOCUMENTS

WO    WO 01/16725 A2    3/2001

OTHER PUBLICATIONS

An Environment Physically Distributed In Java IEEE, 2001, TDB v36n7 p. 327-328, Remote File Access Transparency via Transmission Control Protocol Internet Protocol. RD n448 8-2001 #98 p. 1374, Abstraction of Remote Operating Systems, Aug. 2001.

*Primary Examiner*—Chuck O Kendall
(74) *Attorney, Agent, or Firm*—Libby Z. Handelsman; Gregory K. Goshorn; Greg Goshorn, P.C.

(57) ABSTRACT

For use in an integrated development environment, such as Eclipse, a common connection registry of connections to remote systems is presented. The connection registry contains objects and subsystem objects. The connection objects have attribute information for the remote system whereas the subsystem objects contain information specific to a particular tool and connection. The framework further presents a common user interface by which tools can be registered within a connection, or by which a new connection can be created. The common user interface presents application program interfaces by which connection objects and subsystem objects can be created, retrieved, maintained, updated, modified, stored in the registry, and/or deleted, etc. The framework is capable of maintaining connections and tools within an integrated development environment independent of the type and/or operating system of the remote systems, the programming language of the tools, etc.

4 Claims, 11 Drawing Sheets

U.S. PATENT DOCUMENTS

| | | |
|---|---|---|
| 6,199,194 B1 | 3/2001 | Wang et al. |
| 6,205,440 B1 | 3/2001 | Nusbickel |
| 6,219,675 B1 | 4/2001 | Pal et al. |
| 6,289,501 B1 | 9/2001 | Mutschler, III |
| 6,324,681 B1 | 11/2001 | Sebesta et al. |
| 6,334,158 B1 | 12/2001 | Jennyc et al. |
| 6,493,742 B1 * | 12/2002 | Holland et al. ............... 709/200 |
| 6,502,102 B1 * | 12/2002 | Haswell et al. .............. 707/102 |
| 6,510,550 B1 * | 1/2003 | Hightower et al. ........... 717/108 |
| 6,580,916 B1 * | 6/2003 | Weisshaar et al. ........ 455/456.1 |

* cited by examiner

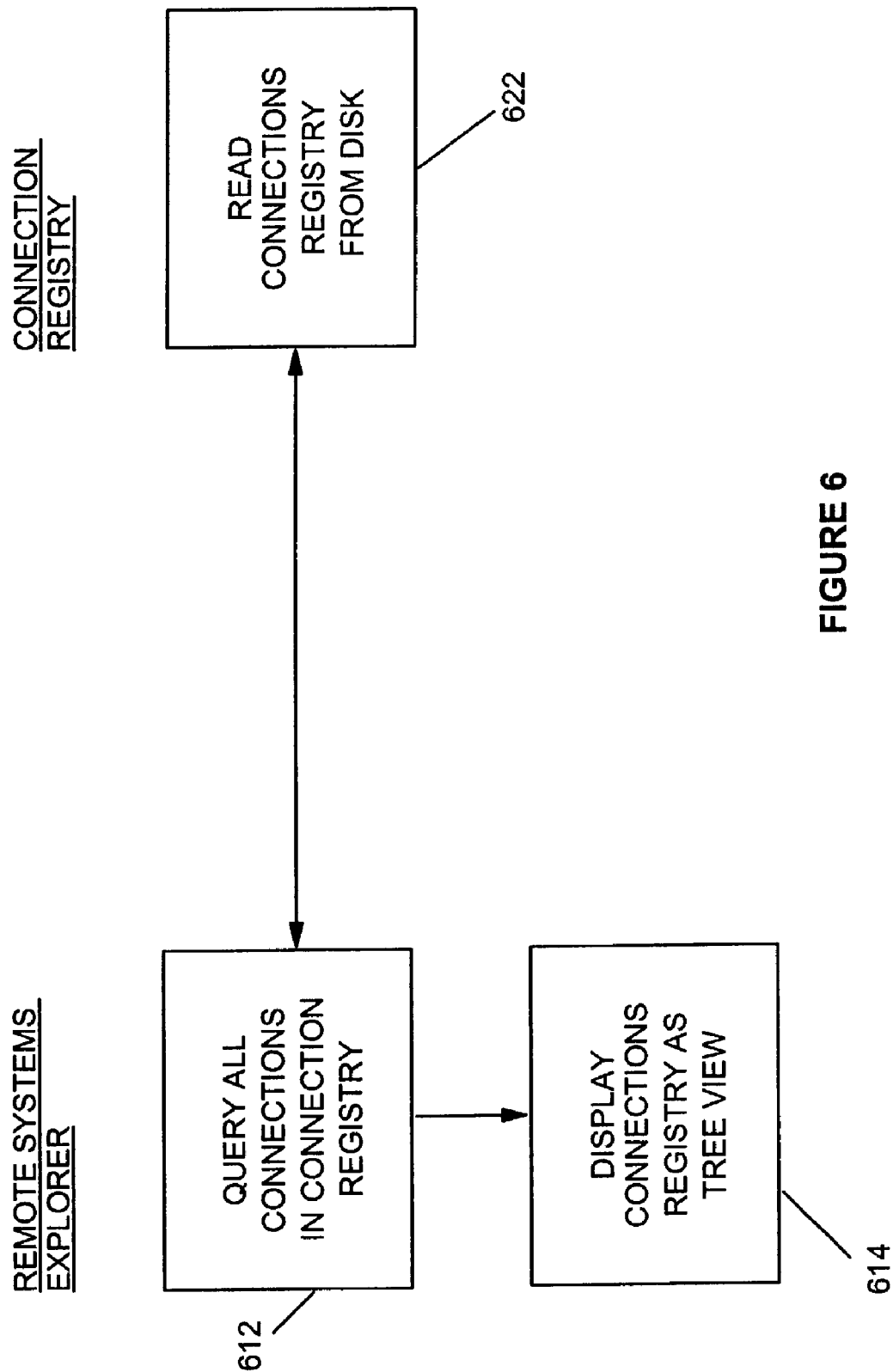

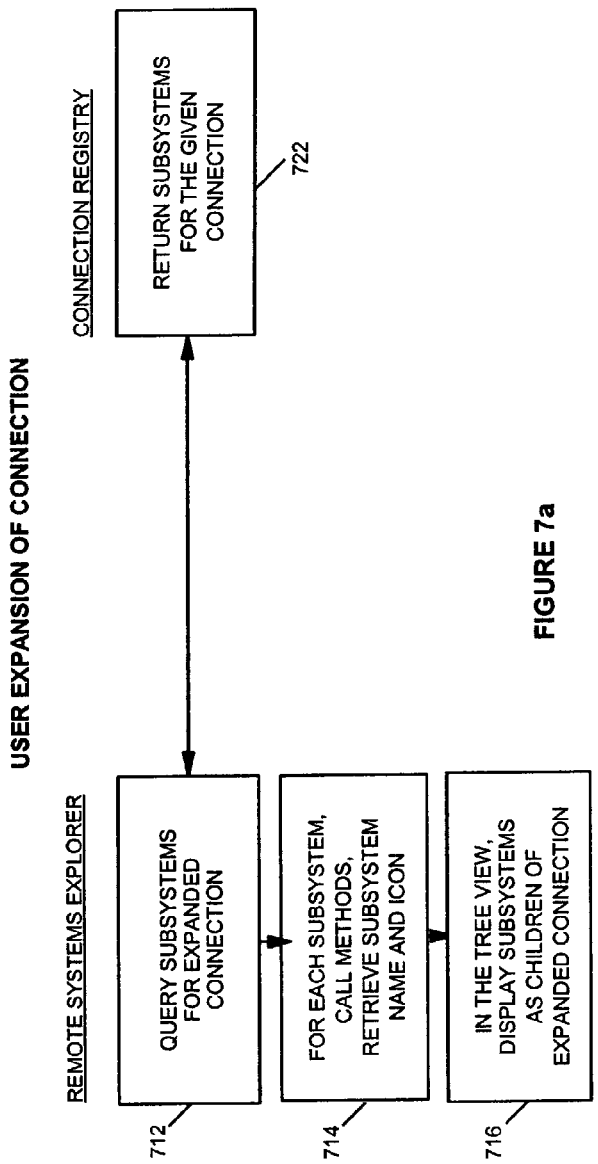
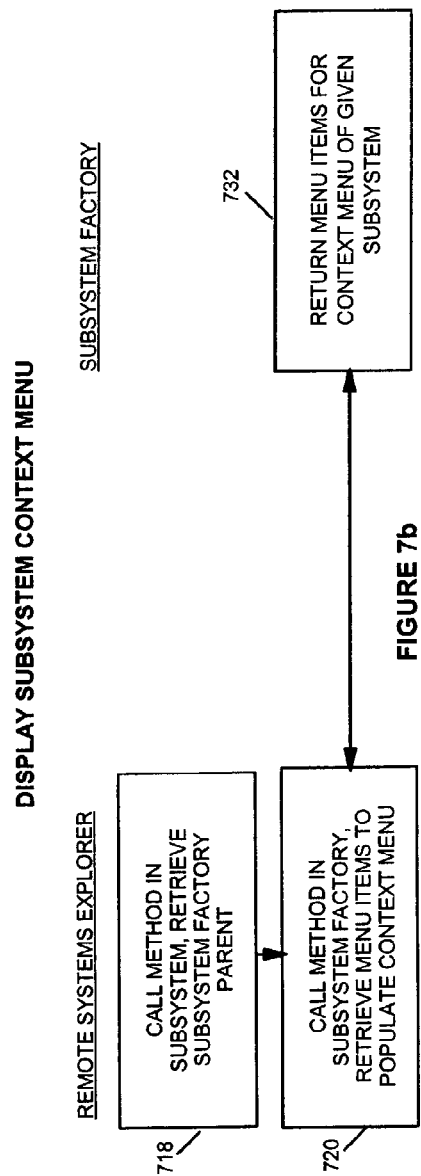
FIGURE 7a
FIGURE 7b

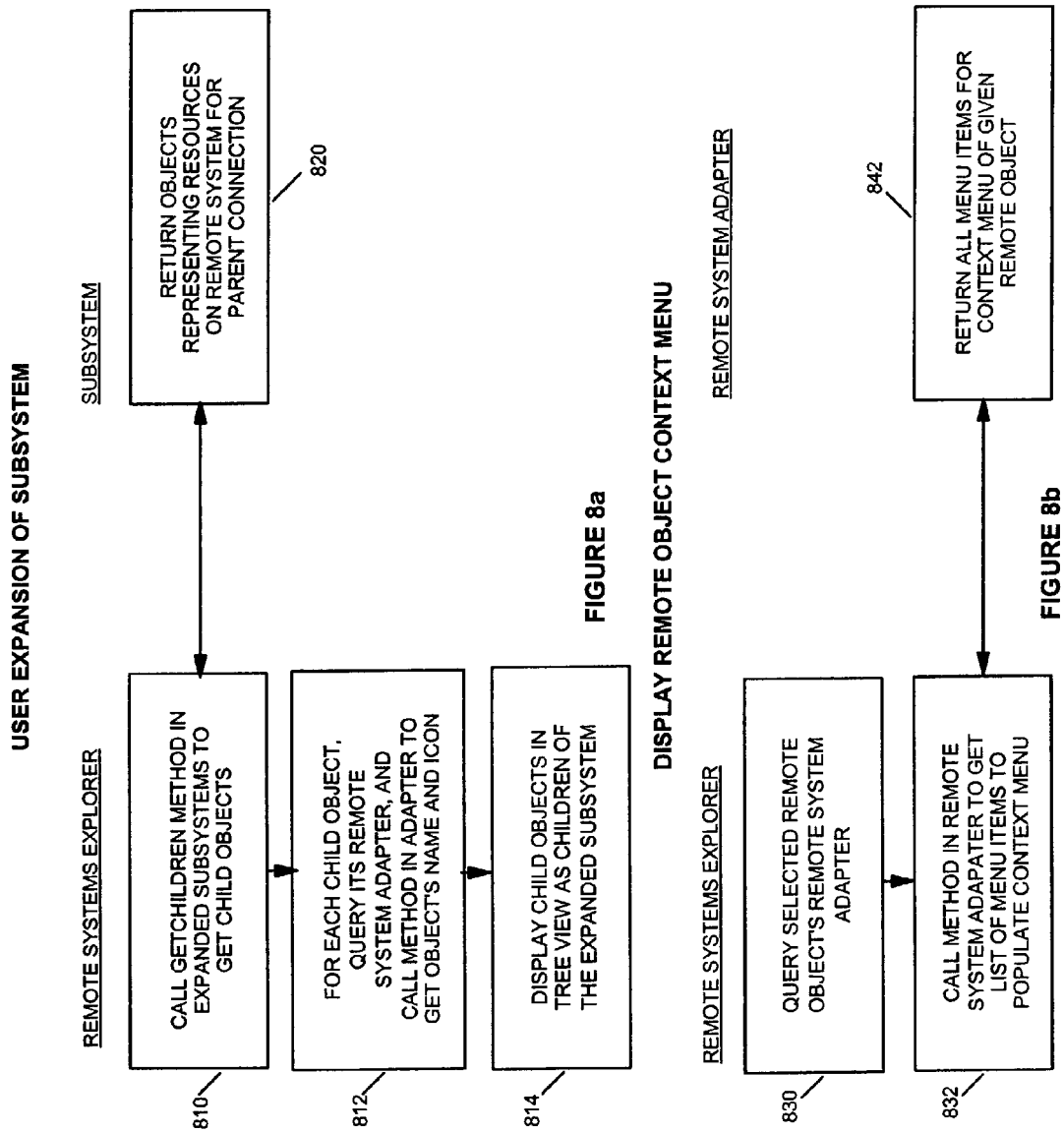

FRAMEWORK TO ACCESS A REMOTE SYSTEM FROM AN INTEGRATED DEVELOPMENT ENVIRONMENT

RELATED APPLICATIONS

This application is related to U.S. Pat. No. 7,107,546, entitled "Toggleable Widget for a User Interface," issued Sep. 12, 2006, U.S. Pat. No. 7,359,990, entitled "Editing Files of Remote Systems Using an Integrated Development Environment", issued Apr. 15, 2008, U.S. application Ser. No. 10/286, 560, entitled "Transferring Data and Storing Metadata Across A Network," filed Oct. 31, 2002, and U.S. application Ser. No. 10/285,993, entitled "Accessing a Remote iSeries or AS/400 Computer System from the Eclipse Integrated Development Environment," filed Oct. 31, 2002, which are hereby incorporated by reference in their entireties.

TECHNICAL FIELD

This invention relates generally to the field of the development of computer applications, and more particularly, relates to a framework in an integrated development environment (IDE) that manages connections to remote systems and provides a consistent user interface for multiple tools that access multiple remote systems.

BACKGROUND OF THE INVENTION

Modern software development has its own terminology and, herein at the beginning, a tutorial in definitions as used herein may be helpful. An application is a software program used by an end user; examples of applications include a scheduling client program or application wherein a person may schedule employees' work days; a word processing application; a presentation application to prepare slides for a talk; a database application in which to manipulate data; a spreadsheet application, etc. A tool is a software application that enables a software developer to write additional applications. Examples of tools include: a remote-accessing tool; a database tool to access and manipulate remote relational database tables, columns and rows; a message queue tool to access and manipulate remote message queues; an import tool to select files on a remote system for importing into an ongoing software development project; a performance tool to access and configure remote performance; a tracing tool to trace execution of remote performance, a file tool to access folders and files in the file system of a remote system, etc. A component is software code that can be reused across multiple applications; in other words, a component is standard software that can be pulled off a server and incorporated into new applications using a tool by software developers. For example, a calendar component may be used in several applications such as a scheduling application, a presentation application, a data base application to calculate employee's vacation and pay, etc. Thus, a software developer uses tools to pull components from a local or remote server to create applications.

Software developers found it was first convenient and then necessary to have all code generation tools under one umbrella, called an integrated development environment (IDE). Integrated development environments, as the name suggests, give the software engineer an environment wherein the appropriate tools needed for source code editing, compiling, linking, testing, debugging, and profiling are seamlessly integrated. The advantage of using an integrated development environment is that the software developer need not be concerned about the tool interfaces when moving from one phase of code development to the other. Typically the integrated development environments track the phase of code generation and take appropriate actions of invoking the necessary tool.

Examples of a software development, analysis, and maintenance environments have been known for over twenty years, one of the first was Genera by Symbolics and LISP. For Unix programmers, FUSE is an integrated development environment that has tools that include editors, program builders, source code managers, debuggers, cross-referencers, call graph browsers, file comparison tools, main page hypertext viewers, search tools, performance profilers, heap analyzers, program visualizers, and an optional C++ class browser. Other examples are IBM's VisualAge products, VisualAge C++ and VisualAge for Java. VisualAge C++ provides an environment and toolset for multiplatform object oriented application development with class libraries and frameworks to build applications on AIX. VisualAge for Java is IBM's Java development environment to build Web-enabled enterprise applications with support for building and testing Java applets, servlets, and Enterprise JavaBeans. There are many other integrated development environments, but basically it can be seen that integrated development environments may provide a complete capability for building, editing, compiling, dynamically and statically analyzing programs, configuring, source browsing, and debugging, etc.

Because there was a serious need in the industry for an open source integrated development environment that supported C and C++ in addition to Java, IBM and RedHat developed an integrated development environment called Eclipse to develop software in a myriad of computer languages. Eclipse runs not only on Linux but also other operating systems. There is some special interest in Linux because it is an open source operating system, meaning that it does not belong to a single one company, but is owned and developed by the public. The Eclipse integrated development environment is thus an open source environment for creating, integrating and deploying application development tools across a broad range of computing technology. Eclipse provides a common set of services and establishes the framework, infrastructure, and interactive workbench to build application software and related elements. Eclipse includes, inter alia, a source code editor with code browsing and navigation features like code assist, syntax based color highlighting and integrated help facilities that uses a graphical user interface.

Eclipse.org is an open consortium of software development tool vendors that collaborate to create development environments and product integration and share an interest in creating easy-to-use and interoperable products based upon plug-in technology. By collaborating and sharing core integration technology, tool vendors can concentrate on their areas of expertise and the creation of new development technology. Eclipse.org now includes members and founding steward companies: Borland, IBM, MERANT, QNX Software Systems, Rational Software, RedHat, SuSE, TogetherSoft and WebGain.

Although the Eclipse platform has built-in functionality, most of that functionality is very generic. Additional tools are necessary to extend the platform to work with new content types, to do new things with existing content types, and to focus the generic functionality on something specific. Eclipse is built on a mechanism for discovering, integrating, and running modules called plug-ins. The plug-in mechanism is used to partition Eclipse itself Indeed, separate plug-ins provide the workspace, the workbench, and so on. When Eclipse is launched, the software developer is presented with an integrated development environment composed of the set of available plug-ins. Even the Eclipse platform runtime itself has its own plug-in. A tool provider writes a tool as a separate plug-in that operates on files in the workspace and surfaces its tool-specific user interface in the workbench.

Eclipse Tutorial

Following is a brief tutorial on Eclipse with many concepts carrying over to integrated development environments in general. If the reader is familiar with Eclipse or integrated development environments, then she/he may wish to skip this section. With respect to FIG. 1, Eclipse has several compartments.

Plug-Ins

The smallest unit of the Eclipse platform that can be developed and delivered separately is the plug-in. Usually a small tool is written as a single plug-in, whereas a complex tool has its functionality split across several plug-ins. Except for a small kernel known as the Platform Runtime, all of the Eclipse Platform's functionality is located in plug-ins. A typical plug-in consists of Java code in a Java Archive (JAR) library, some read-only files, and other resources such as images, web templates, message catalogs, native code libraries, etc. Some plug-ins do not contain code at all, an example of which is a plug-in that contributes online help in the form of HTML pages. A single plug-in's code libraries and read-only content are located together in a directory in the file system, or at a base URL on a server. There is also a mechanism that permits a plug-in to be synthesized from several separate fragments, each in their own directory or URL. This is the mechanism used to deliver separate language packs for an internationalized plugin. Each plug-in has a manifest file containing XML and declaring its interconnections to other plug-ins. The interconnection model is simple: a plug-in declares any number of name extension-points, and any number of extensions to one or more extension points in other plug-ins.

Because any plug-in is free to define new extension points and to provide new application program interfaces (APIs) for other plug-ins to use, a plug-in's extension points can be extended by other plug-ins. An extension point may declare additional specialized XML element types for use in the extensions. On start up, the Platform Runtime discovers the set of available plug-ins, reads their XML manifest files, and builds an in-memory plug-in registry. Eclipse matches extension declarations by name with their corresponding extension point declarations. Any problems, such as extensions to missing extension points are detected and logged. The resulting plug-in registry is available via the Platform application program interface. Plug-ins cannot be added after startup. Thus, manifest information is available from the plug-in registry without activating the contributing plug-in or loading any of its code. This property is key to supporting a large base of installed plug-ins only some of which are needed in any given user session. Until a plug-in's code is loaded, it has a negligible memory footprint and impact on start up time.

A plug-in is activated when its code actually needs to be run. Once activated, a plug-in uses the plug-in registry to discover and access the extensions contributed to its extension points, without activating any of the contributing plug-ins. The contributing plug-in will be activated when the user selects a preference from a list. Once activated, a plug-in remains active until the Platform shuts down.

The Platform Runtime declares a special extension point for applications. When an instance of the Platform is launched, the name of an application is specified and the only plug-in that gets activated initially is the one that declares that application. By determining the set of available plug-ins up front, and by supporting a significant exchange of information between plug-ins without having to activate any of them, the Platform provides each plug-in with a rich source of pertinent information about the context in which it is operating.

The Eclipse Platform is run by a single invocation of a standard Java virtual machine. Each plug-in is assigned its own Java class loader that is solely responsible for loading its classes. Each plug-in explicitly declares its dependence on other plug-ins from which it expects to directly access classes. A plug-in controls the visibility of the public classes and interfaces in its libraries. This information is declared in the plug-in manifest file; the visibility rules are enforced at runtime by the plug-in class loaders.

The Eclipse Platform Runtime also provides a mechanism for extending objects dynamically. A class that implements an "adaptable" interface declares its instances open to third party behavior extensions. Multiple parties can independently extend the same adaptable objects, each for a different purpose. Any plug-in can exploit this mechanism to add behavior to existing adaptable objects, and to define new types of adaptable objects for other plug-ins to use and possibly extend.

The various tools plugged in to the Eclipse Platform operate on regular files in the user's workspace. The workspace consists of one or more top-level projects, where each project maps to a corresponding user-specific directory in the files system.

A project nature mechanism allows a tool to tag a project in order to give it a particular personality, or nature. For example, the web site nature tags a project that contains the static content for a web site, and the Java nature tags a project that contains the source code for a Java program. A single project may have many different natures so that tools are able to share a project without having to know about each other.

Each project contains files that are created and manipulated by the user. All files in the workspace are directly accessible to the standard programs and tools of the underlying operating system. Tools integrated with the Platform are provided with an application program interface for dealing with workspace resources (the collective term for projects, files, and folders).

The workspace provides a marker mechanism for annotating resources. Markers are used to record diverse annotations such as compiler error messages, to-do list items, bookmarks, search hits, and debugger breakpoints. The marker mechanism is open. Plug-ins can declare new marker subtypes and control whether they should be saved between runs.

The Platform allows several different incremental project builders to be registered on the same project and provides ways to trigger project and workspace-wide builds. An optional workspace auto-build feature automatically triggers the necessary builds after each resource modification operation (or batch of operations). The workspace save-restore process is open to participation from plug-ins wishing to remain coordinated with the workspace across sessions. A two-phase save process ensures that the important state of the various plug-ins are written to disk as an atomic operation. In a subsequent session, when an individual plug-in gets reactivated and rejoins the save-restore process, it is passed a workspace-wide resource delta describing the net resource differences since the last save in which it participated. This allows a plug-in to carry forward its saved state while making the necessary adjustments to accommodate resource changes made while it was deactivated.

The Eclipse Platform user interface is built around a workbench that provides the overall structure and presents an extensible user interface to the user. The workbench application program interface and implementation are built from two toolkits: the Standard Widget Toolkit (SWT) which is a widget set and graphics library integrated with the native window system but is independent of the operating system (OS); and JFace which is a user interface toolkit that simplifies common user interface programming tasks. The entire Eclipse Platform user interface and the tools that plug into it use SWT for presenting information to the user. At this time, it is useful to distinguish between an application program interface (API) and a user interface (UI). APIs are functions that are called by code, not by humans. In Java, these are methods; in COBOL, these are paragraphs; in C and C++ these are functions; and in other languages, these are procedures. A user interface, on the other hand, is an interface with which a human interacts with an application.

The Standard Widget Toolkit—SWT

For each different native window system, the SWT implementation uses widgets that are native to the operating system and the application wherever possible; where no native widget is available, the SWT implementation provides a suitable emulation. Emulated widgets invariably lag behind the look and feel of the native widgets, and the user interaction with emulated widgets is usually different enough to be noticeable, making it difficult to build applications that compete head-on with shrink-wrapped applications developed specifically for a particular native window system. SWT addresses this issue by defining a common application program interface available across a number of supported window systems.

JFace

JFace is a user interface toolkit with classes for common user interface programming tasks. JFace is window-system-independent in both its API and implementation, and is designed to work with SWT without hiding it. JFace includes the usual user interface toolkit components of image and font registries, dialog, preference, and wizard frameworks, and progress reporting for long running operations. Two of its more interesting features are actions and viewers. Actions allow user commands to be defined independently from their exact whereabouts in the user interface to allow the same action to be used in several places in the user interface; thus it is easy to change the location of an action in the user interface without having to change the code for the action itself. Viewers are model-based adapters for certain SWT widgets. Viewers handle common behavior and provide higher-level semantics than available from the SWT widgets. The standard viewers for lists, trees, and tables support populating the viewer with elements from the client's domain and keeping the widgets in synch with changes to that domain. The standard viewer for text supports common operations such as double click behavior, undo, coloring, and navigating by character index or line number. Text viewers provide a document model to the client and manage the conversion of the document to the information required by the SWT styled text widget. Multiple viewers can be open on the same model or document; all are updated automatically when the model or document changes in any of them.

The Workbench

Unlike SWT and JFace, which are both general purpose user interface toolkits, the workbench provides the user interface personality of Eclipse and supplies the structures in which tools interact with the user. Because of this central and defining role, the workbench is synonymous with the Eclipse user interface as a whole and with the main window the user sees when Eclipse is running.

The Eclipse user interface paradigm is based on editors, views, and perspectives. From the user's standpoint, a workbench window consists visually of views and editors. Views provide information about some object that the user is working with in the workbench. A view may augment other views by providing information about the currently selected object. For example, the standard properties view presents the properties of the object selected in another view. Views have a simpler life cycle than editors: modifications made in a view, such as changing a property value, are generally saved immediately, and the changes are reflected immediately in other related parts of the user interface. Editors allow the user to open, edit, and save objects, and follow an open-save-close life cycle much like file system based tools but are more tightly integrated into the workbench. When active, editors can contribute actions to the workbench menus and tool bar. The Platform provides a standard editor for text resources; more specific editors are supplied by other plug-ins. Perspectives manifest themselves in the selection and arrangements of editors and views visible on the screen. A workbench window can have several separate perspectives only one of which is visible at any given moment. Each perspective has its own views and editors that are arranged, e.g., tiled, stacked, or detached, for presentation on the screen. Several different types of views and editors can be open at the same time within a perspective. A perspective controls initial view visibility, layout, and action visibility. The user can quickly switch perspective to work on a different task, and can easily rearrange and customize a perspective to better suit a particular task. The Platform provides standard perspectives for general resource navigation, online help, and team support tasks.

Tools integrate into this editors-views-perspectives user interface paradigm in well-defined ways. The main extension points allow tools to augment the workbench by adding new editors, views, perspectives, while arranging old and new views to suit new user tasks. Tools may also augment existing editors, views, and perspectives by adding new actions to an existing view's local menu and tool bar, to the workbench menu and tool bar when an existing editor becomes active, to the pop-up content menu of an existing view or editor, and by adding views, action sets, and shortcuts to an existing perspective.

Eclipse thus takes care of all aspects of workbench window and perspective management. Editors and views are automatically instantiated as needed, and disposed of when no longer needed. The display labels and icons for actions contributed by a tool are listed in the plug-in manifest so that the workbench can create menus and tool bars without activating the contributing plug-ins.

Tools written in Java using Eclipse's APIs achieve the highest level of integration with the Platform. At the other extreme, external tools launched from within the Platform must open their own separate windows in order to communicate with the user and must access user data via the underlying file system. Their integration is therefore very loose, especially at the user interface level.

Version and Configuration Management (VCM)

The team support component of Eclipse adds version and configuration management (VCM) capabilities to projects in the workspace and augments the workbench with all the necessary views for presenting version and management concerns to the user. Eclipse's team support model has advanced features of (1) multiple heterogeneous repositories; (2) lightweight model of team collaboration; and (3) resource versions. The team support model centers on repositories that store version-managed resources on shared servers. Eclipse is designed to support a range of existing repository types in which a single workspace can simultaneously access different types of repositories.

A stream maintains a team's shared configuration of one or more related projects and their folders and files. A team of developers share a stream that reflects their ongoing work and all their changes integrated to date. In effect, a stream is a shared workspace that resides in a repository.

Each team member works in a separate workspace and makes changes to private copies of the resources. Other team members do not immediately see these changes. At convenient times, a developer can synchronize their workspace with the stream. As a team member produces new work, they share this work with the rest of the team by releasing those changes to the stream. Similarly, when a team member wishes to get the latest work available, they catch up to the changes released to the stream by others. Both synchronization operations can be done selectively on resource subtrees, with an opportunity to preview incoming and outgoing changes. When the repository type supports an optimistic concurrency model, conflicting incoming and outgoing changes are detected automatically. The developer resolves the conflict, usually by merging the incoming changes into their local workspace, and releases the result. This concurrency model supports groups of highly collaborative developers who work on a common base of files and who frequently share their changes with each other. It also supports developers who work offline for long periods, connecting to their repository only occasionally to synchronize with the stream.

A repository typically may have any number of streams, which are distinguished by name. Streams act as lightweight containers for building product releases, and as safe places to store a developer's personal work and early prototype versions outside the team's main development stream. When the same project appears in different streams, the resources evolve independently so that changes released to one stream have no effect on other streams. Heterogeneous repositories and repository types are supported so that each project in the workspace can be managed in a different type of repository. The workspace records stream-specific synchronization information for a project's resources, which detect incoming and outgoing file creations, deletions, and content changes.

Help

The Eclipse Help mechanism allows tools to define and contribute documentation to one or more online books. For example, a tool usually contributes help style documentation to a user guide, and API documentation, if any, to a separate programmer guide. Raw content is contributed as HTML files. The facilities for arranging the raw content into online books with suitable navigation structures are expressed separately in XML files. This separation allows pre-existing HTML documentation to be incorporated directly into online books without needing to edit or rewrite them.

In summary, Eclipse provides a nucleus of generic building blocks and application program interfaces like the workspace and the workbench, and various extension points through which new functionality can be integrated. Through these extension points, tools written as separate plug-ins can extend Eclipse. With Eclipse, the user is presented with an integrated development environment that is specialized by the set of available tool plug-ins, but rather than being the end of the story, Eclipse is really just the beginning. Tools may also define new extension points and APIs of their own and thereby serve as building blocks and integration points for yet other tools.

End of Eclipse Tutorial

The quality of the experience when using an integrated development environment depends significantly on how well the tools integrate with the integrated development environment and how well the various tools work with each other. This integration and coordination becomes increasingly important in an open source system such as Linux and Eclipse. A connection captures the information needed for a tool to access a remote system. Depending on how the tool communicates with the remote system, this information could include the transmission control protocol/internet protocol (tcp/ip) hostname of the remote system, and the port number that the tool uses to talk to its code or daemon or service running on that remote system. Most remote-accessing tools permit the user to define this information once, and then save it in a local file so that it can be reused. All such integrated development environment remote-accessing tools or plug-ins require the end-user to pre-define a connection to a remote system, and the tools do not recognize each other's connections. If every remote-accessing tool has its own unique support for defining connections, then a user may have to pre-define multiple connections to the same remote system, one for each tool the user uses. Each remote-accessing tool offers its own unique user interface and hence its own unique experience for the end-user. Until a user becomes experienced in each tool, this increases their frustration and reduces their productivity. These two shortcomings of the prior art are illustrated in FIG. 2.

In FIG. 2, there are three remote systems 20, 22, 24. Each system is a computer that contains different types of resources of interest and connected through a network 30 to an integrated development environment user. At the bottom of FIG. 2, an integrated development environment 40 for a particular software developer has three remote-accessing tools 42, 44, 46, most likely authored by different tool writers possibly having no knowledge of each other or each other's tools. In FIG. 2, each remote system 20, 22, 24 has two tools with predefined connections to it, e.g., remote system 20 has predefined connections to Tool A 42 and Tool B 44, and remote system 22 has predefined connections to Tool B 44 and Tool C 46 and so on for a total of six connections. The limited and predefinition of these connections presents a first problem hinted at in the Eclipse tutorial. It would make more sense to have only three predefined connections because there are only three remote systems. A second problem illustrated by the scenario of FIG. 2 is that because each remote-accessing tool was independently authored, each may offer a completely unique experience for the integrated development environment user.

There is thus a need in the software development industry for sharing connections to tools among remote systems and for a common user interface for remote systems.

SUMMARY OF THE INVENTION

These needs and others are satisfied by a framework for use with an integrated development environment, the framework comprising: a registry of at least one connection to at least one remote system, the at least one connection used by a plurality of tools in the integrated development environment to access the at least one remote system; and a common user interface shared by the plurality of tools, the common user interface capable of displaying the at least one connection and the plurality of tools and a context menu associated with each connection in the registry. The framework may comprise a number application program interfaces used by the common user interface by which the connections and specific attribute information for each registered tool in the registry can be created, retrieved, modified, and/or restored to the connection registry. One of the application program interfaces may expose XML extension points of the tools. The connection registry may comprise at least one connection object which comprises general attributes common to at least one remote system; and a subsystem object for at least one of the plurality of tools that can access the at least one remote system, the subsystem object containing specific attribute information. A subsystem object may contain the scope of a tool, i.e., whether the tool is limited to a particular type of system.

The common user interface may be an expandable tree hierarchy displaying the connection objects and underneath, a list of the tools that can access the at least one remote system using that displayed connection object, and underneath, each tool, the subsystem objects, if any, containing specific attribute information. The common user interface further comprises a context menu of the application program interfaces by which to manipulate, duplicate, delete, change, and/or reorder or otherwise modify at least one connection object associated with at least one remote system.

The invention may further be considered a method within an integrated development environment to register at least one tool that accesses at least one remote system, the method comprising the steps of: creating a connection object associated with the at least one remote system; populating the connection object with general attributes of a connection from the integrated development environment to the remote system; determining if the at least one tool has an associated subsystem factory having specific attribute information pertaining to the tool; determining if the subsystem factory is supported by the connection object; if so, creating a subsystem object containing the specific attribute information unique to the connection and the tool; and saving the subsystem object and the connection object in a connection registry. The method may further retrieve a number of subsystem objects for a particular connection object; call any applicable application program interface to retrieve a name and icon for each of the retrieved subsystem objects; and display the subsystem name and icons for each of the retrieved subsystem objects in a common user interface.

The invention further is an integrated development environment having a common registry of the connections from the integrated development environment to remote systems; and a number of tools to access remote systems using at least one of the connections in the common registry. The common registry may have connection objects, each connection object having at least the name, address, and type of remote system with which the connection object is associated. The common registry may also have subsystem objects, each subsystem object being unique to one of the tools registered in the common registry. The integrated development environment may also have a common remote systems explorer to provide the methods and application program interfaces by which to create, change, and/or delete any connection within the common registry.

The invention is further considered a computer processing device, comprising: a processor; a memory functionally connected to the processor; a network interface by which the processor can access one or more remote systems across a connected or wireless network; an integrated development environment executing on the processor, the integrated development environment having a framework by which tools within the integrated development environment may access one or more remote systems, the framework comprising a connection registry of connection objects, each connection object containing attributes of a remote system accessible by a tool. The framework may also have a common user interface with a context menu to invoke methods by which to create and/or act upon the connection objects. The framework is independent of the type of remote system and independent of a language of the tool and integrated development environment.

The invention may also be a framework for an integrated development environment within a computer software development program, the framework having a means to create a plurality of connections to all remote systems accessible by a plurality of tools used by the integrated development environment; a means to establish a common registry of all connections irrespective of a type of remote system or of a language of a tool or of a file structure of data accessible by a tool; a means to store any preexisting connections in the common registry; a means to create a subsystem having information unique to at least one of the plurality of tools, the unique information pertaining to at least one of the remote systems; a means to create a common view of all the connections and all the tools that can access the remote systems using the connections, and all the unique information in a hierarchical tree interface; a means to retrieve any of the connections and/or unique information; and/or a means to modify any of the connections and/or unique information; and/or a means to restore any of the connections and/or unique information; and/or a means to store the preexisting, created, and modified connections and/or unique information in the common registry and the common view.

The invention is also an article of manufacture, comprising a data storage medium tangibly embodying a program of machine readable instructions executable by an electronic processing apparatus to perform method steps for operating an electronic processing apparatus, said method steps comprising the steps of: opening an integrated development environment; reading any preexisting connections to remote systems, the preexisting connections stored within the integrated development environment; providing a wizard by which new connections to remote systems can be created; and providing at least one application programming interface that can act upon a new connection, or a preexisting connection, or specific information relating to a particular tool to access a specific remote system. The article of manufacture may further comprise a registry of all connections and all specific information, and could provide a hierarchical tree view of all connections and all specific information in the registry.

There is a method to use an integrated development environment having tools that can access remote systems, the method comprising the steps of: querying a registry of connection objects; presenting the registry of connection objects; and retrieving a selected connection object. The subsystem objects of the selected connection objects maybe further queried, one maybe selected and retrieved. A remote system adapter of the selected connection objects may also be queried, selected and retrieved.

A graphical user interface in an integrated development environment is also disclosed, having a list of connections, each connection to an individual remote system; a list of tools under each connection, each tool capable of connecting to the individual remote system; and an icon associated with each of the plurality of tools.

The invention is also a connection registry for use in an integrated development environment having at least one of connection object; at least one subsystem object, if any exist;

at least one remote system adapter, if any exist; whereby a tool in the integrated development environment can access a remote system using the connection object, regardless of the type of remote system and regardless of the language of the tool.

BRIEF DESCRIPTION OF THE DRAWING

Additional features and advantages of the invention will further be described below with regard to the Drawing, wherein:

FIG. 6 is a simplified process chart by which the common interface view of an embodiment of the framework can be initialized.

FIG. 7 is a simplified process chart by which connections can be expanded within a context menu of the common interface view of an embodiment of the framework.

FIG. 8 is a simplified process chart by which subsystems can be expanded within a context menu of the common interface view of an embodiment of the framework.

DETAILED DESCRIPTION OF THE INVENTION

Figure 3:
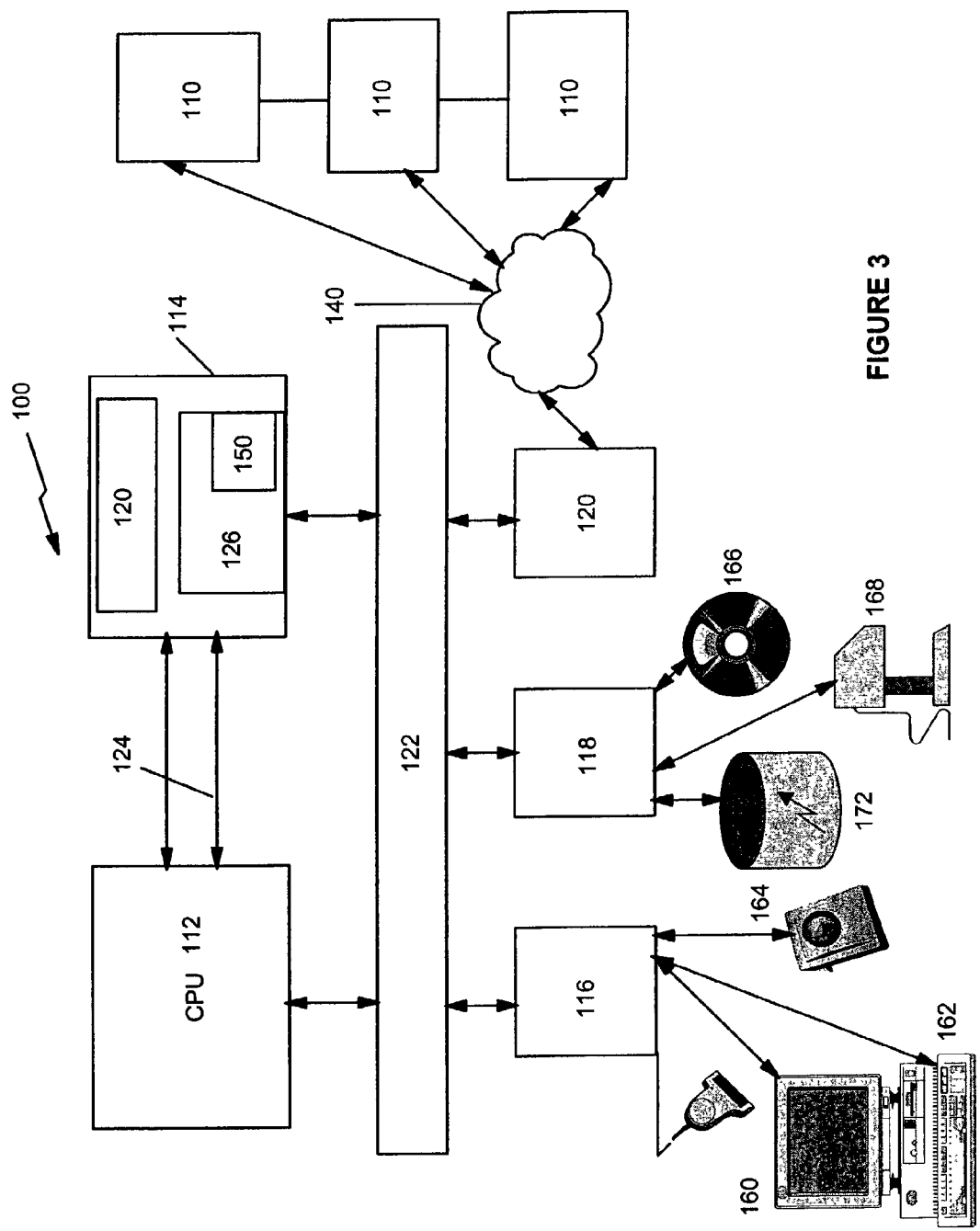
FIG. 3 is a simplified representation of a computer network in which an integrated development environment may function.

Referring to the Drawing, wherein like numbers denote like parts throughout the several views, FIG. 3 shows a high-level block diagram of a computer network system 100, consistent with an embodiment of the invention. Computer network system 100 may comprise any number of networked computers 110, each of which may have a central processing unit (CPU) 112, main memory 114, terminal interface 116, data storage interface 118, and a network interface 120. The various devices communicate with each other via internal communications bus 122. CPU 112 is a general-purpose programmable processor, executing instructions stored in memory 114; while a single CPU is shown in FIG. 3, it should be understood that computer systems having multiple CPUs could be used. Communications bus 122 supports transfer of data, commands and other information between different devices, and while shown in simplified form as a single bus, it is typically structured as multiple buses; and may be arranged in a hierarchical form, including an internal bus 124 which may connect the CPU 112 with memory 114.

Memory 114 is a random-access semiconductor memory for storing data and programs; memory 114 is shown conceptually as a single monolithic entity but it is well known that memory is often arranged in a hierarchy of caches and other memory devices, some or all of which may be integrated into the same semiconductor substrate as the CPU 112. Random access memory (RAM) devices comprising the main storage of computer, as well as any supplemental levels of memory, e.g., cache memories, nonvolatile or backup memories, programmable or flash memories, read-only memories, etc. In addition, memory 114 may be considered to include memory storage physically located elsewhere in computer, e.g., a cache memory in a processor or other storage capacity used as a virtual memory, e.g., as stored on a mass storage device or on another computer coupled to computer via network.

Operating system 120 and applications 126 reside in memory 114. Operating system 120 provides, inter alia, functions such as device interfaces, management of memory pages, management of multiple tasks, etc. as is known in the art. Examples of such operating systems may include Linux, Aix, Unix, Windows-based, OS/400, etc. These and other various applications, components, programs, objects, modules, etc. may also execute on one or more processors in another computer coupled to computer 110 via a network 140, e.g., in a distributed or client-server computing environment, whereby the processing required to implement the functions of a computer program may be allocated to multiple computers 110 over a network 140. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Applications 126 may include integrated development environments 150 and if a server software application is included, network interface 120 may interact with the server software application to enable computer system 110 to be a network server.

It should be appreciated that computer 110 typically includes suitable analog and/or digital interfaces 116, 118, 120 between CPU 112 and the attached components as is known in the art. For instance, computer 110 typically receives a number of inputs and outputs for communicating information externally. For interface with a user or operator, computer 110 typically includes one or more user input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that with some implementations of computer 110, e.g., some server implementations, direct user input and output may not be supported by the computer. Terminal interface 118 may support the attachment of single or multiple terminals and may be implemented as one or multiple electronic circuit cards or other units. Data storage 172 preferably comprises one or more rotating magnetic hard disk drive units, although other types of data storage, including a tape or optical driver, could be used. For additional storage, computer 110 may also include one or more mass storage devices 166 and 172, e.g., a floppy or other removable disk drive, a hard disk drive, a direct access storage device (DASD), an optical drive e.g., a CD drive, a DVD drive, etc., and/or a tape drive, among others.

Furthermore, computer 110 may include an interface 120 with one or more networks 140 to permit the communication of information with other computers 110 coupled to the network 140. Network interface 120 provides a physical connection for transmission of data to and from a network 140. The network may be the Internet but the network could also be any smaller self-contained network such as an Intranet, a WAN, a LAN, or other internal or external network using, e.g., telephone transmissions lines, satellites, fiber optics, T1 lines, public cable, etc. and any various available technologies. Computer system and remote systems 110 may be desktop or PC-based computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may be networked through network 140.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks, e.g., CD-ROM's, DVD's, etc., among others, and transmission type media such as digital and analog communication links. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. The illustrated embodiments are not intended to limit the present invention. Indeed, those skilled in the art will recognize that other alternative hardware and/or software embodiments may be used without departing from the scope of the invention.

As discussed earlier, Eclipse is a integrated development environment that is project based. Using Eclipse, a software developer, also referred to as a programmer or simply as a user, creates software by working on local copies of folders and files that are partitioned into named projects. Eclipse enables programmers to further extend one or more Eclipse-supplied or tool-supplied extension points by authoring Eclipse tools as plug-ins written in Java. While an embodiment of the invention is described using Eclipse as an integrated development environment to which the invention is applicable, the concepts and embodiments herein can easily be adapted and are equally pertinent to other integrated development environments used by programmers writing applications. This invention thus pertains to any integrated development environment written and extensible in any programming language. Although Eclipse and extensions to Eclipse are written in Java, the programming language is not a limitation of the embodiments described here. Eclipse is used an example of an existing integrated development environment so that one of skill in the art may will better appreciate how these embodiments herein may be used by any integrated development environment to enable access to resources on remote systems.

In Eclipse, tool writers can write tools called plug-ins that are registered with the integrated development environment using XML. XML stands for Extensible Markup Language and it is the universal format for structured documents and data on the Internet. Recall that the XML registration process identifies the tools to Eclipse by telling Eclipse where the Java classes (code) exist for the plug-ins and the type of functionality of the tool by identifying which extension points are implemented. Extension points in Eclipse are predefined areas of functionality that tools can plug into and are defined by XML. Tool writers can also define their own extension points to enable other tool writers to extend or plug into their plug-ins. Thus, the embodiments described herein are particularly useful in any extensible integrated development environment, meaning that tool writers can extend the environment by writing seamless tools to be plugged into it.

What is disclosed herein is a generic and extensible framework that provides a common connection registry and a consistent user interface shared by remote-accessing integrated development environment tools. The framework exposes extension points that allow tool writers to register their remote-accessing tools with the framework to participate in the framework. The framework further comprises of a number of required and optional application programming interfaces (APIs) that tool writers use to query and contribute to the connection registry and to contribute to the common user interface. Any integrated development environment tool that accesses remote resources such as files, commands, jobs, databases, daemons, queues and so on, can be developed or modified to sit on top of this framework. An integrated development environment having the framework is able to access remote systems independent of the operating system or type of remote system. The tools accessing the remote systems, moreover, may be written in the same or different computer programming languages.

The framework described herein not only benefits the tool writer because it reduces the effort to write a remote-accessing tool within an integrated development environment, but also benefits the software developer using the integrated development environment by offering a single registry for remote system connections and a single user interface for accessing all manner of resources on a remote system. Of course, the resources that can be accessed depend on what remote-accessing tools have been installed on the user's integrated development environment.

A connection refers to the information required for a tool to connect to, access, and interact with a remote system. A remote system is any computer other than the one in which the integrated development environment is installed and being used by the programmer, and may be of any type, e.g., Windows, Unix, Linux, iSeries and zSeries. The framework itself is responsible for several functions: it supplies the user interface in which a user can create, change and delete connections; and it also permanently saves the information to memory, i.e., the connection information persists when the integrated development environment is stopped and the framework further restores the connection information from memory when the integrated development environment is started again.

In order for the framework to establish the common registry for these connections, the framework defines a common set of information or attributes that will be stored in a connection. The framework divides a connection into two distinct objects: a connection object and a subsystem object. The connection object contains information that is common across all remote-accessing tools whereas a subsystem object contains information that is unique per tool. A connection object is an instance of the Connection Java class, and holds the attributes for a particular connection. Each connection object has multiple subsystem objects, one subsystem object per remote-accessing tool.

To create connection objects, a user may invoke the interface wizard supplied by the framework, or may use a user interface for creating connection objects supplied by the tool. In the latter case to programmatically register the connection object, the framework supplies the code and the application program interface, which allows programmatic registration of a connection object into a connection registry. When the user creates a connection object, the method createConnection in the connection registry object is called by the framework. This method takes as parameters all the information the user supplied in the connection wizard supplied by the framework or by the tool itself. The method will create a new connection object, i.e., an instance of the Connection class, populate it with the information that was passed via the parameters, and save the connection object in the connection registry. This makes the connection persistent and available in memory. The information passed to the createConnection method may include such general attributes as: (a) connection name; (b) system identifier, such as a tcp/ip address or host name; (c) the type of remote system, such as Windows, Unix, Linux, iSeries or zSeries, etc.; (d) a default user ID which can be overridden per tool by supplying a user ID attribute in their subsystem object; and (e) descriptive text. Henceforth, the term connection will also have the meaning and the nuances of a connection object.

While some basic information is common for all tools, it is also true that each tool requires additional information so the system objects are instances of any Java class that implements the Java SubSystem interface supplied by the framework. For each connection there exists a list of subsystem objects, one subsystem object per tool, provided by the tool when the user creates the connection. The framework requests a subsystem object of every tool whenever the user creates a connection object and the list of subsystem objects is stored with the connection object. Each tool is free to define their subsystem class to hold whatever unique information is needed for the tool and connection. Tool-unique information and the knowledge that a particular tool is scoped to only systems of a particular type or type(s) are among the attributes stored in subsystem objects. The exact mechanism used to register subsystem factory classes may vary, but what is important is that the process allows the framework to discover all registered subsystem factory classes, and for each class, for the framework to discover what system types and hence, what tools, are supported by the subsystem factory.

This registration is most conveniently done by use of an XML file with XML tags and attributes to identify these properties. When used with the Eclipse integrated development environment, the framework facilitates registration with a plug-in XML file and an extension point for subsystem factories. Tool writers identify, in their plug-in xml file, that they are extending the subsystem factory extension point and identify the subsystem factory class name and the system types as attributes in their XML for this extension. Other attributes that the framework may require at registration time are the label/name and icon to show in the common user interface view for this tool, the name of the vendor supplying this subsystem factory, and a unique ID. Below is an example of code that can be used in Eclipse to register a subsystem factory.

```
<extension point="com.ibm.etools.systems.core.subsystemfactory">
    <factory
        systemtypes="Linux;Unix"
        name="Files"
        icon="icons/full/obj16/systemfiles_obj.gif"
        vendor="IBM Corp"
        class="com.ibm.etools.systems.universalfilesubsys.impl.UniversalFileSubSystemFactoryImpl"
        id="ibm.files">
    <factory>
</extension>
``` framework further provides a basis to store this unique information per tool. For example, while the host name for the remote system is usually common, the port that a tool uses to communicate with its server-side code or daemon may be unique per tool. Another example of information unique to a database tool might be that the tool requires the name of a JDBC database driver. It is through the use of subsystem objects that the framework enables connections to capture unique information per tool.

Figure 4:
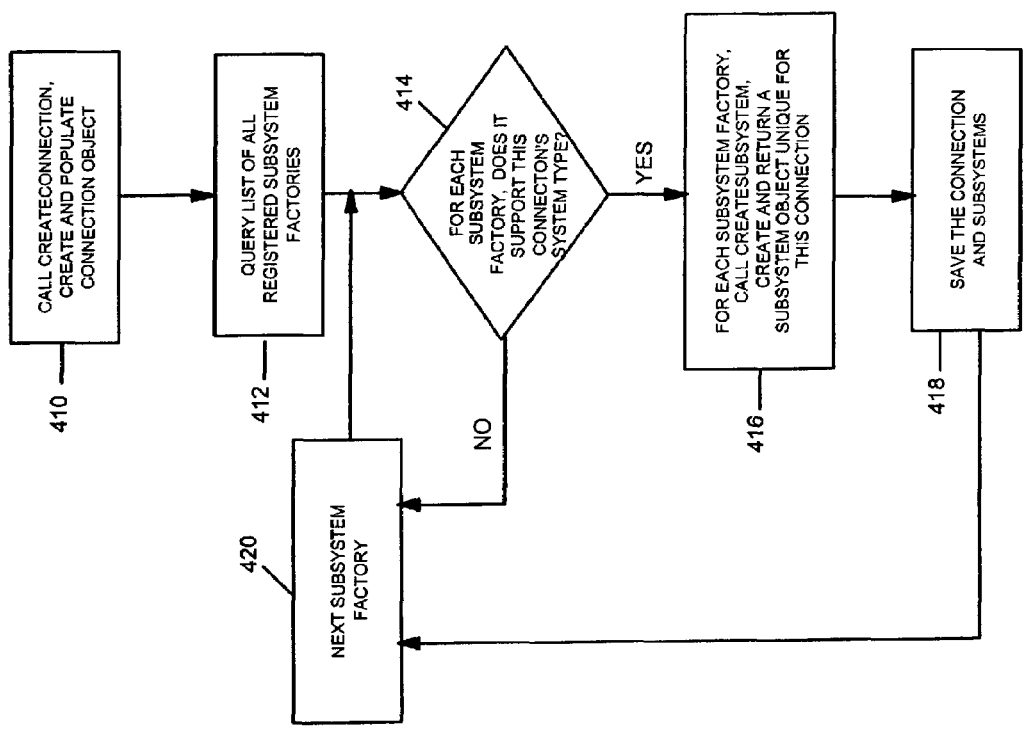
FIG. 4 is a simplified process chart by which connection objects and subsystem objects are created and saved within an embodiment of the framework.

The framework enables each tool to provide a unique subsystem object for each connection through a subsystem factory. The subsystem factory is a class that implements the framework-supplied subsystem factory interface. Each tool must register its subsystem factory class with the framework. This registration identifies the class along with some of its attributes to the framework. The framework instantiates the subsystem factory class once, thus creating a single subsystem factory object per tool which in turn produces subsystem objects when requested by the framework. Thus, sub- FIG. 4 capsulates the process flow of the framework when the user, beginning at step 410, creates a new connection object and populates the object with user-supplied information. The list of all registered subsystem factories is queried from the integrated development environment at step 412, then the systems type attributes of each registered subsystem factory are examined to determine if the subsystem factory supports this connection's system type or not, as in step 414. For each subsystem factory that supports this connection's system type, its createSubSystem method is called. This subsystem factory method will create a subsystem object and default its attributes, then return the subsystem object to the framework in step 416. Then the framework will store the connection together with all of its subsystems in block 418. A next subsystem factory is visited under the same processes, as in step 420.

Figure 5:
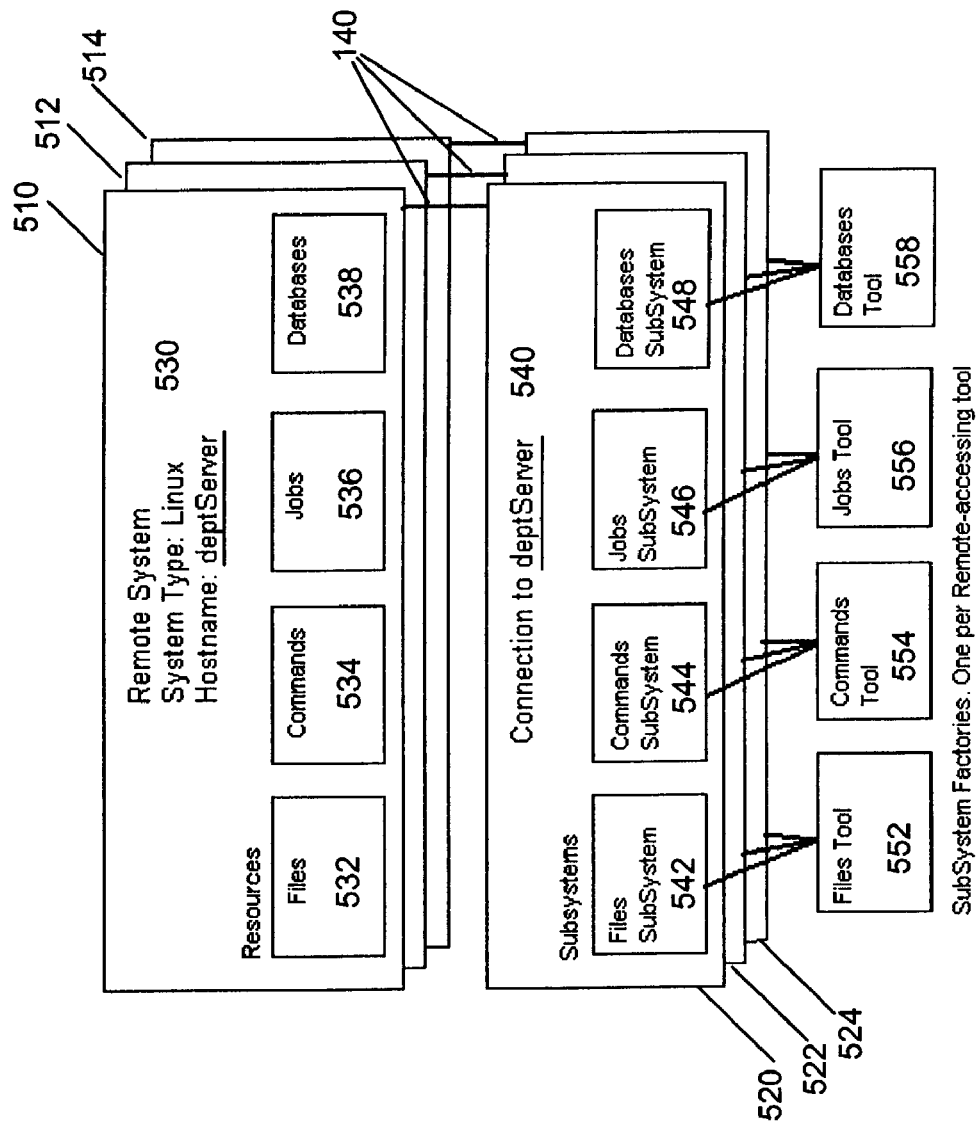
FIG. 5 is a simplified block diagram of the relationship tendered by an embodiment of the invention of a remote system accessed by tools, and how subsystem factories can relate to different subsystems and different connections. It is suggested that FIG. 5 be printed on the face of the patent.

FIG. 5 is a simplified block diagram of an example of connections, subsystems and subsystem factories. In FIG. 5 there are four tools: a files tool 552, a commands tool 554, a jobs tool 556, and a databases tool 558 that access remote systems over a network 140 and work with files 532, commands 534, jobs 536, and databases 538 on that remote system 510. Each tool supplies a single subsystem factory; thus the files tool 552 supplies a files subsystem 542, a command tool 554 supplies a commands subsystem 544, and so on. For each connection 520, 522, and 524, the subsystem factory supplied a single subsystem object created when the framework called the createSubSystem method in the subsystem factory when the connection was created. The connection highlighted in FIG. 5 is to a remote system 510 with hostname deptServer at 530. The connection object 520 itself stores the hostname attribute for the remote system 540, while the subsystem objects 542, 544, 546 and 548 store additional attributes about the connection, unique to the tool 552, 554, 556 and 558, respectively, that supplied the subsystem.

The framework stores and manages these subsystem objects in the common registry keyed by connection. The connection registry supplies the methods as application programming interfaces to allow tool writers to query and manipulate or otherwise act upon previously defined connections. A set of methods named getConnections finds and returns a list of existing connections, all of which have certain attribute values such as the same hostname, or the same system type, or have a subsystem created by the same subsystem factory. The attributes on which to search are passed as parameters to the getConnections method. The getConnections method returns zero or more connection objects. Any subsystem objects are contained by connection objects. Recall that the registry itself may be, in one embodiment, a set of persistent objects in memory saved to disk as simple XML files by the framework.

For a tool to retrieve its subsystem object, given a connection object and those attributes stored within it, another application program interface in the connection registry named getSubSystem is used. This retrieval application program interface uses a connection object as the first parameter and an identifier of a subsystem factory as the second parameter and returns the subsystem created by the identified subsystem factory within the connection. This is possible because the subsystem objects themselves implement additional interfaces to set and query the ID of the subsystem factory which created them. These application program interfaces are setSubSystemFactoryID and getSubSystemFactoryID, respectively, and are called by the framework. The framework itself requires that all subsystem objects implement an interface that includes these two methods or application program interfaces.

The common interface supplied by the framework for a user to visualize all connections, subsystems, and remote resources manipulated by the tools is called the remote systems explorer (RSE). The remote systems explorer is a user interface tree-view by which a user can manage or otherwise act upon the registry of connections, i.e., the software developers can retrieve, display, create, modify, delete and/or restore connections easily within the framework using the remote systems explorer. Further, within this common interface provided by the framework, software developers who use an integrated development environment can expand a connection to access all the remote-accessing tools available for the remote system defined by that connection. Each tool is represented by its unique subsystem object for the expanded connection. The subsystem object is visualized in the tree-view by its label and icon within the tree, which the common interface queries from the subsystem object itself. The tools allow a user to expand a tool's tree-view node to expose the sub-tree populated with objects representing the resources on the remote system with which the tool works. If the user brings up the context menu of one of these remote resource objects in the common tree-view, the tool supplies the menu items to populate that context menu. When the user goes to the common interface, she/he will see a list of all previously defined connections.

The process the common interface undergoes to retrieve and visualize the list of previously defined connections to remote systems is shown in FIG. 6. In step 612, the common interface view of the framework accesses the connection registry supplied by the framework and calls the getconnections method to get a list of existing connections. In step 622, the connection registry returns the list of connection objects from its in-memory list, or if the list is not yet in memory, it reads it into memory from the local files used to persist the list of connections. In step 614, the tree-view list of the connections is displayed and the user can bring up the context menu to work with that connection. The common interface view supplies all the context menu items including, but not limited to, duplicate, delete, change or re-order, to act upon a connection.

With reference to FIG. 7a, the user can expand a connection to view all the subsystems defined for a connection, with the name and icon supplied by the subsystem itself. In steps 712 and 722, the framework through its common interface, the remote systems explorer, queries the connection registry and returns all the subsystems for an expanded connection. For each subsystem, the framework calls the methods within the subsystem to retrieve the subsystem name and icon, as in step 714. In step 716, the subsystems are displayed in the remote systems explorer as children of the expanded connection. Once the subsystems are displayed the user can bring up the context menu for a subsystem menu to expand the subsystem and perform various actions enabled by the parent subsystem factory that created this subsystem. The framework does this in FIG. 7b, step 718 by calling a method from the remote systems explorer to return the subsystem's factory parent. From the subsystem factory, a method is called to query the subsystem factory for the menu items to show in the context menu of the selected subsystem, as shown in steps 720 and 732 of FIG. 7b. An alternative implementation might be to query these menu items from the selected subsystem itself, although that would be less efficient because the menu items will be the same for all subsystem objects created by the same subsystem factory. What is important is that the tool supplies the menu items for its subsystem, and the common interface of the framework manages presenting them to the user when she/he brings up the context menu for the subsystem.

Once the subsystems for an expanded connection are displayed, the user can expand one of those subsystems. What the common user interface, the remote systems explorer, displays for the children nodes of the expanded subsystem is at the discretion of the tool writer who authored the subsystem. FIG. 8a shows the algorithm that the remote systems explorer, i.e., the common user interface, uses to get the children nodes for an expanded subsystem, and the algorithm for populating the context menu of the children nodes when the user right clicks on one. The remote systems explorer calls the getchildren method of the expanded subsystem, in steps 810 and 820, which results in a list of objects. If that list is empty, no children nodes are displayed in the remote systems explorer for the expanded subsystem. If that list is not empty, the objects in the list are visualized as child nodes of the expanded subsystem in the remote systems explorer, as in steps 812 and 814. Typically, these child objects are representations of resources on the remote system identified by the connection containing the expanded subsystem. For example, for a subsystem for the Files tool, the folders and files of the root folder might be shown for Unix and Linux systems, and the drives for Windows systems. For a database tool, the database schemas found on the remote system might be shown. The common interface view neither knows nor cares what these objects are; it enforces no requirements on the tool writer in terms of programming interfaces that the child objects must implement.

While the common interface remote systems explorer does not need to know what the subsystem child objects are and where the objects are located, the common interface, however, does need the object's display name and icon for visualization in the tree. In addition, the common interface needs to know if the object is itself expandable and, if so, needs to be able to query the object's children when it is expanded. If the user brings up the context menu of the child object, moreover, the common interface needs to be able to query the menu items that populate the context menu which is shown in steps 830, 832, and 842 of FIG. 8b. All of this code can be done by forcing each subsystem child object to implement a framework-supplied Java interface that has the necessary methods in it for querying this information.

The framework-supplied interface, however, might be too restrictive or cumbersome especially if the tool is simply returning a list of objects returned by some communication layer such as JDBC for databases. In cases where the subsystem is not directly responsible for creating the child objects, forcing each child object to implement a given Java interface would impose the overhead of wrapping all child objects inside other objects simply for the purpose of implementing the imposed interface. This could be very inefficient in both performance and memory. The framework, therefore, provides a remote system adapter object for these easier retrievals. An adapter object does implement a framework-supplied interface for all these requirements. For each child object, the framework will query its remote systems adapter when the user expands a subsystem or brings up the context menu for a child object, as shown in steps 812 and 830. How this is done depends on the integrated development environment being used. For Eclipse, a supplied mechanism queries for adapters from the Eclipse platform. The tool writer must register their adapters using the Eclipse mechanism. For other integrated development environments, the framework would simply require that the subsystem factory supply a method to return such an adapter object, given a child object. The input to the methods prescribed by the remote systems adapter interface is the child object for which information is being requested. This allows tool writers the option of supplying a single remote system adapter object, which handles all requests for all subsystem child objects. The methods in the adapter interface include getName and getIcon to visualize child objects in the common interface view, getActions to return the menu items for populating the context menu of a child object within the remote systems explorer, hasChildren to tell the common interface view if this child object itself has child objects, and getChildren for returning those child objects if hasChildren returns true.

To briefly summarize the framework up to this point, the framework invokes a common user interface, the remote systems explorer, by which the subsystem factory class, the subsystem interface, and the remote systems adapter interface may participate in the common connection registry and the common interface view. The subsystem factory class, the subsystem interface, and the remote systems adapter interface are provided by the tools themselves. The subsystem factory is a singleton class that is registered with the integrated development environment. The subsystem object is created by the subsystem factory and holds persistable information unique to the tool and the connection; there is one subsystem object per connection per tool. The subsystem factory must also supply a method for querying the common interface's context menu items for a given subsystem object. The subsystem object also prescribes methods for querying the subsystem's display name and icon and for returning the child objects to show when a user expands a subsystem in the common interface. The remote system adapter is a single interface for each different type of child object returned by the subsystem object or by expanding a child object. The remote system adapter interface prescribes methods to return an object's display name and icon, children and context menu items. All such methods accept the selected or expanded child object as input.

Figure 9:
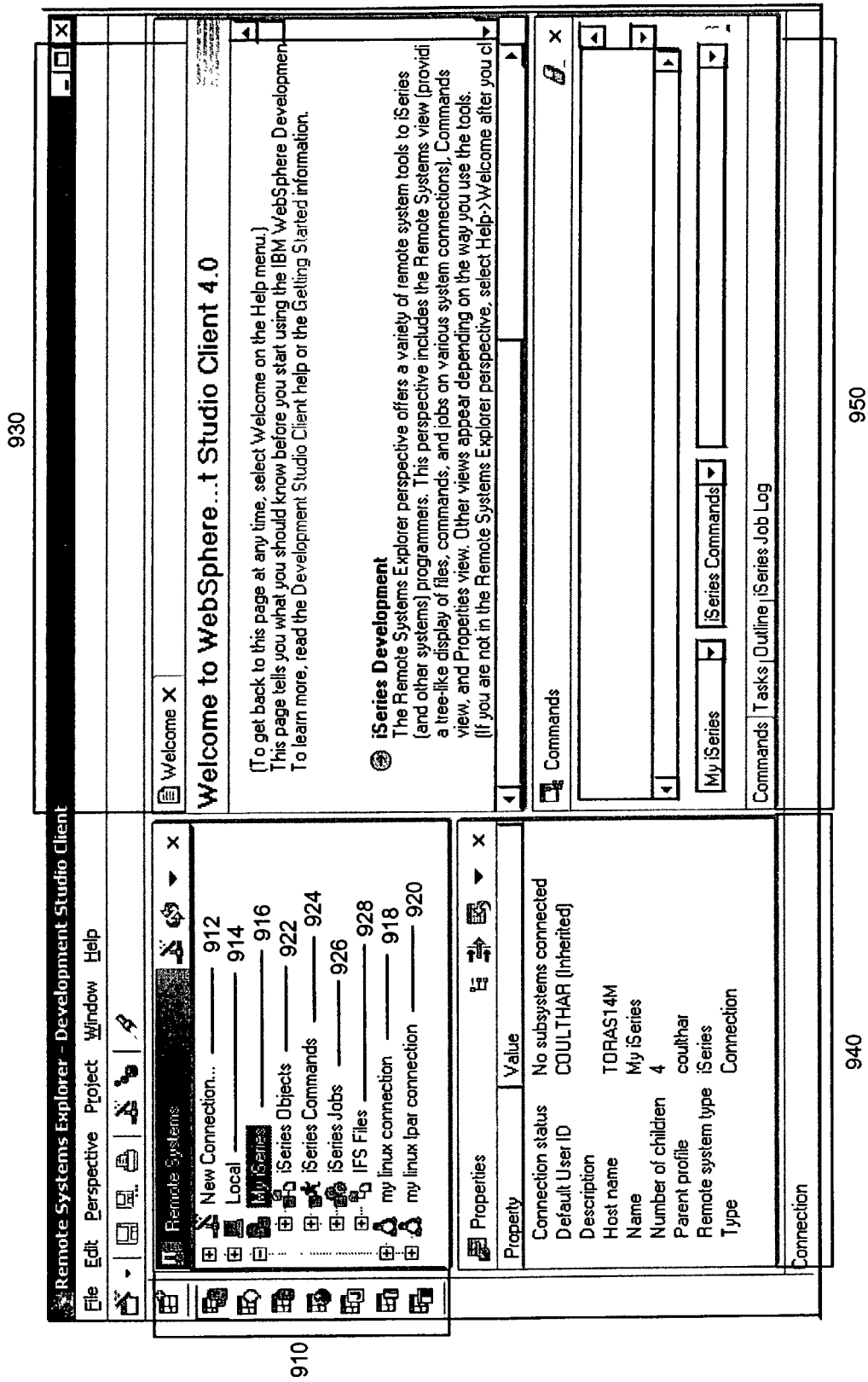
FIG. 9 is a screen shot of the graphical user interface of an Eclipse integrated development environment in which a common interface view in accordance with an embodiment of the framework is illustrated.

In FIG. 9, we see an example of the common interface, the remote systems explorer, as implemented in the Eclipse integrated development environment. In FIG. 9, the remote systems explorer view 910 is in the upper left. In it there are four connections defined: the Local connection 914, the My iSeries connection 916, the my linux connection 918, and my linux ipar connection 920. The New Connection 912 launches the framework's wizard for defining a new connection. The My iSeries connection 916 has been expanded and there are four subsystems shown under that connection: the iSeries Objects 922, the iSeries Commands 924, the iSeries Jobs 926, and the IFS Files 928; these four subsystems implies that four remote-accessing tools have been registered for iSeries systems. When these connections were established, moreover, each supplied a subsystem for this connection. The other views 930, 940, and 950 in FIG. 9 are not part of the remote systems explorer but are supplied by tools as part of their unique application program interface or by the integrated development environment itself. FIG. 9 illustrates how the common view of the framework complements the other views 930, 940, and 950 of Eclipse to create a rich productive and informative integrated development environment experience.

Figure 10:
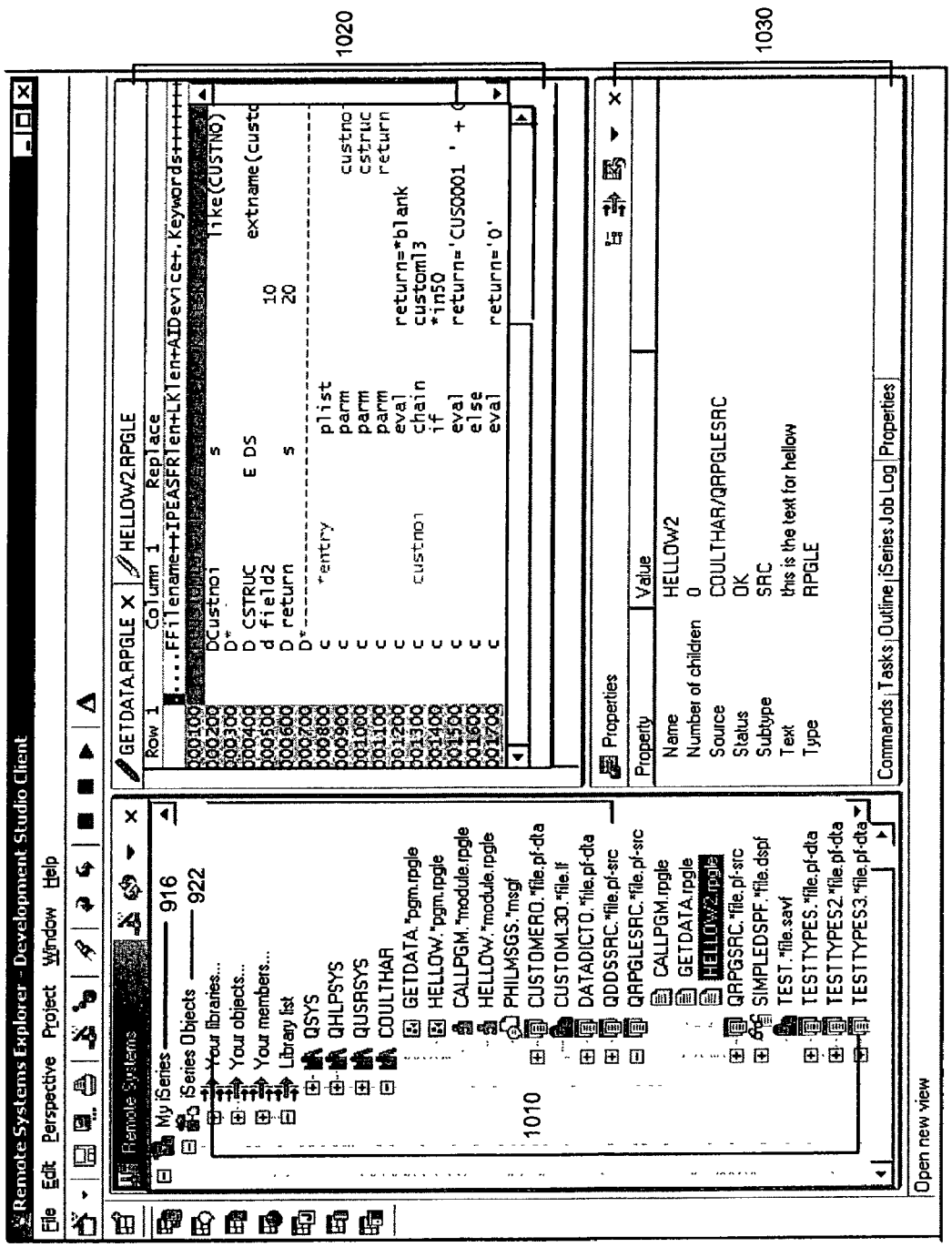
FIG. 10 is a screen shot of the graphical user interface of an Eclipse integrated development environment in which a common interface view is expanded and the connection objects and subsystem objects in accordance with an embodiment of the framework are illustrated.

In FIG. 10, the iSeries Objects subsystem 922 of the My iSeries connection 916 has been expanded in the hierarchical tree-view of 1010. FIG. 10 shows how a remote-accessing tool is actually presented to the user by the framework. In this case, this tool lists objects within the iSeries file system and uses context menu items (not shown) to enable actions such as opening an edit view at 1020 on the selected file and/or a property sheet view at 1030 to show information about the selected file. A context menu is a popup menu, the contents of which are supplied by the tool writer via the algorithms described in FIGS. 7 and 8, depending if the object is a subsystem object (FIG. 7) or a subsystem child object (FIG. 8). Because the tool writer supplies the menu items for the context menu, they are free to make these menu items launch supporting and complementing views that enrich the RSE view for the IDE user.

Recall the first of the two problems described earlier: each tool in an integrated development environment has a unique connection to a remote system that it accesses. The framework described herein facilitates a single common registry for all such connections which all remote-accessing tools may share. By providing this registry, moreover, the framework elegantly supports the notion of a single connection object per remote system while also allowing each tool to define unique attributes as part of that connection. Thus a single connection object may be used effectively by any number of tools. The tool writer benefits by not having to worry about saving and restoring their attributes between sessions, and not having to write the user interface wizard for the connection. The framework handles both of these tasks. The integrated development environment user benefits by not having to define multiple connections to a single remote system, one per tool. The integrated development environment user simply defines a single connection and all tools automatically recognize and can use that connection. If the integrated development environment supports team sharing, moreover, this unitary registry of connections can be shared simultaneously by multiple users of the integrated development environment, thereby increasing productivity of an entire team. When multiple tools share a common collection of connections, the integrated development environment user and team need only create one connection per remote system. That connection may be used across disparate tools that need not be aware of each other and may be authored by different tool writers. Thus, the integrated development environment user and/or team becomes more productive because connections need not be redundantly defined. A consequence of the unitary registry, moreover, is that when using different remote-accessing tools, the user and/or team is not redundantly prompted for their user ID and password to establish the connection's live communication session.

The second problem mentioned earlier and resolved by the framework is the each tool that accesses remote systems has a different user interface. The common user graphical interface, called the remote systems explorer, is a single view for exploring objects on remote servers. The remote systems explorer is a tree-view that allows the user to manage remote connections. The user may also drill down on any connection to access the remote resources as defined by each registered remote-accessing tool. For example, the user would be able to drill down on a given connection and access database objects, message queues, files, commands, jobs, performance and tracing daemons and so on. Each tool that is built on top of the framework may still retain their own unique application program interfaces, but the common view of the framework provides a single place to go for any and all work related to remote systems.

Figure 1:
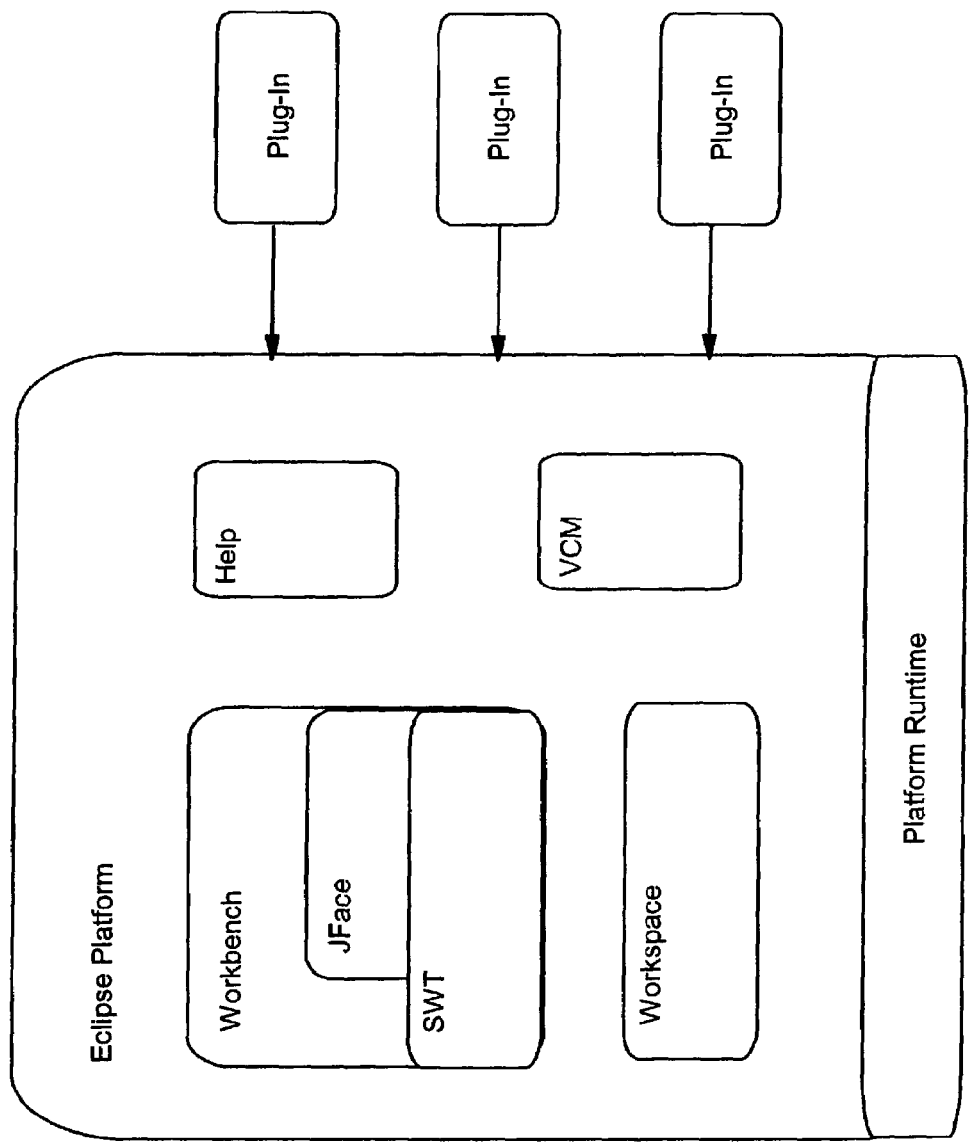
FIG. 1 is a simplified block diagram of the prior art Eclipse integrated development environment.
Figure 2:
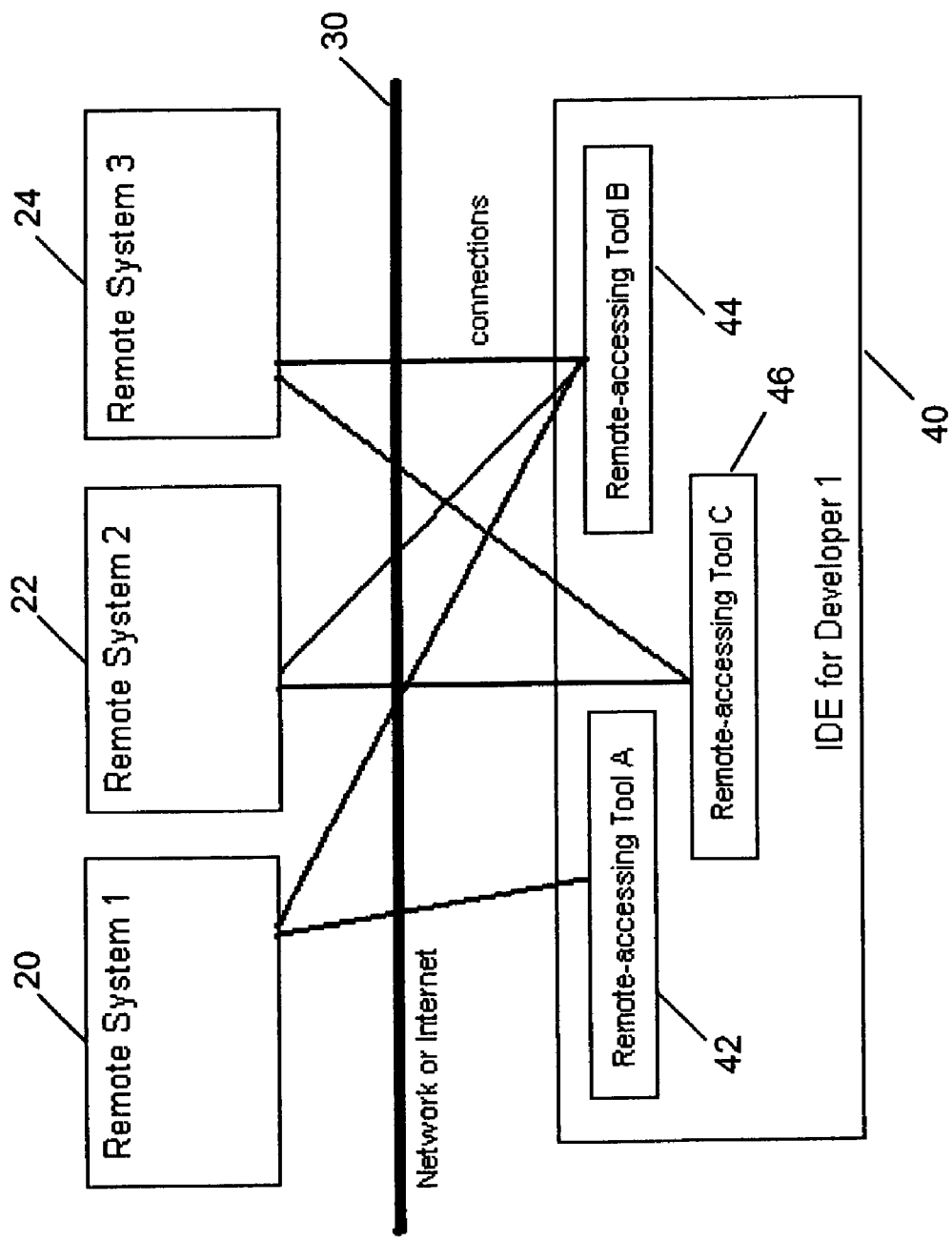
FIG. 2 is a simplified block diagram of a user within a prior art integrated development environment having tools to access remote systems.
Figure 11:
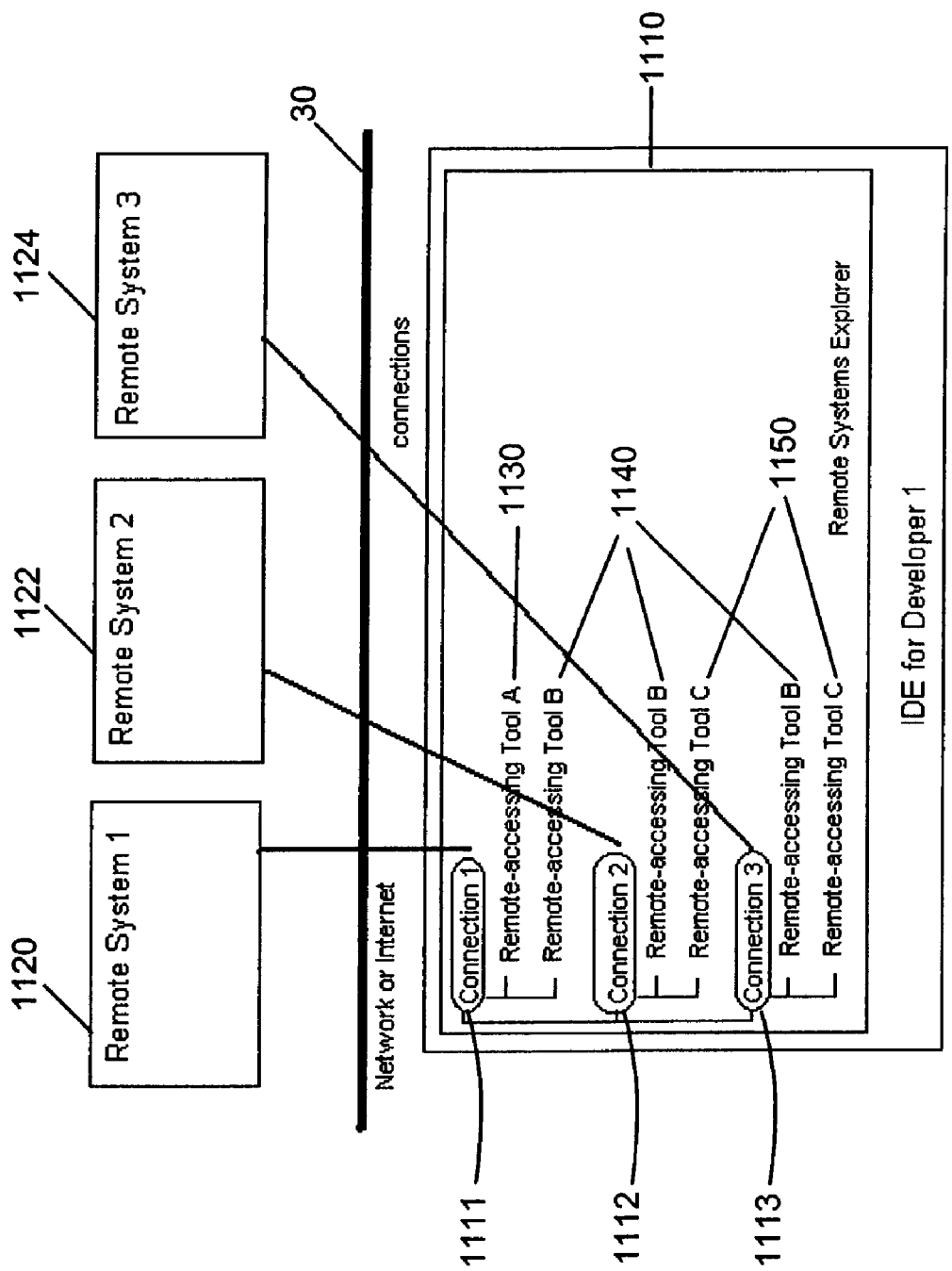
FIG. 11 is a simplified block diagram of the new paradigm embodied by the framework in which a user of an integrated development environment can visualize and manipulate connections required by tools to access remote systems.

In FIG. 11 we show the refinement of the scenario from FIG. 2, this time using the framework and its remote systems explorer to reduce the number of connections and to offer a common and consistent user interface experience. In FIG. 11, the single remote systems explorer view 1110 lists all the defined connections Connection1 1111, Connection2 1112, and Connection3 1113 for remote systems 1120, 1122, and 1124. When a connection, e.g., Connection1 1111, Connection2 1112, and Connection3 1113 is expanded, all the remote-accessing tools ToolA 1130, ToolB 1140, and ToolC 1150, applicable for the remote system defined by each respective connection are displayed as nodes in the tree. Recall that the tool writer is not precluded from offering their own unique user interface view; the remote systems explorer functions as a front door or launching point to all remote-accessing tools for a given connection. The tool on the remote system can thus be launched by selecting an action in the context menu of the remote systems explorer node for that tool. This common view would allow the integrated development environment user to consider each remote system as a single source against which multiple tools are targeted. In other words, a common view creates a remote-system centered user interface and usage paradigm versus a tool-centered user interface and usage paradigm that occurs when multiple tool writers independently create multiple tools to access one or more remote systems. Thus, while placing few requirements on the tool writer, the framework's common view ultimately allows an integrated development environment to support any number of remote-accessing tools authored by any number of programmers in a consistent manner and as through the tools were aware of each other in terms of connection sharing.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

The embodiments of the invention in which an exclusive property or privilege is claimed are defined as follows:

1. A method by which to register at least two tools that accesses at least one remote system, the method within an integrated development environment and comprising:
   creating a connection object associated with at least one remote system;
   populating the connection object with general attributes of a connection from the integrated development environment to the remote system;
   determining if the at least two tools each have a corresponding associated subsystem factory having specific attribute information pertaining to the respective tool;
   determining if each corresponding subsystem factory is supported by the connection object;
   if so, creating a subsystem object containing the specific attribute information unique to the connection and the two tools; and
   saving the subsystem object and the connection object in a connection registry.

2. The method of claim 1, wherein the general attributes of the connection comprises:
   a connection name;
   a remote system identifier; and
   a type of remote system.

3. The method of claim 2, wherein the general attributes of the connection further comprises:
   a default user ID; and
   a descriptive text.

4. The method of claim 1, wherein the step of registering further comprises:
   retrieving a plurality of subsystem objects for a particular connection object;
   calling a plurality of application program interfaces to retrieve a name and icon for each of the retrieved subsystem objects; and
   displaying the subsystem name and icons for each of the retrieved subsystem objects in a common user interface.

* * * * *